US012743068B1

(12) United States Patent
Ghanem

(10) Patent No.: US 12,743,068 B1
(45) Date of Patent: Sep. 22, 2026

(54) ARTIFICIAL INTELLIGENCE POWERED, SEMANTIC PRESERVING CONVERSION SYSTEM FOR HARDWARE DEDICATED LANGUAGES AND PROGRAMMABLE HARDWARE

(71) Applicant: Janelle Ghanem, Columbus, OH (US)

(72) Inventor: Janelle Ghanem, Columbus, OH (US)

(73) Assignee: Process Champ, LLC, Columbus, OH (US)

(*) Notice: Subject to any disclaimer, the term of this patent is extended or adjusted under 35 U.S.C. 154(b) by 436 days.

(21) Appl. No.: 18/231,287

(22) Filed: Aug. 8, 2023

Related U.S. Application Data

(60) Provisional application No. 63/395,932, filed on Aug. 8, 2022.

(51) Int. Cl.
*G05B 19/05* (2006.01)
*G06F 8/41* (2018.01)
*G06N 3/08* (2023.01)
*G06N 20/00* (2019.01)

(52) U.S. Cl.
CPC ............ *G05B 19/056* (2013.01); *G06F 8/41* (2013.01); *G06N 3/08* (2013.01); *G06N 20/00* (2019.01); *G05B 2219/13118* (2013.01)

(58) Field of Classification Search
CPC ..... G06F 8/40; G06F 8/51; G06F 8/52; G05B 19/056; G05B 2219/13118; G06N 20/00
See application file for complete search history.

(56) References Cited

U.S. PATENT DOCUMENTS

| | | | | |
|---|---|---|---|---|
| 11,487,522 B1 * | 11/2022 | Singh | G06N 3/0442 | |
| 11,977,991 B1 * | 5/2024 | Mugan | G06N 5/045 | |
| 12,045,592 B2 * | 7/2024 | Clement | G06N 3/045 | |
| 2021/0011694 A1 * | 1/2021 | Ni | G06N 3/0442 | |
| 2023/0040412 A1 * | 2/2023 | Ramsl | G06F 8/73 | |
| 2023/0236813 A1 * | 7/2023 | Strenski | G06F 8/447 | 717/137 |
| 2023/0325164 A1 * | 10/2023 | Singh | G06F 8/51 | 717/137 |
| 2023/0350657 A1 * | 11/2023 | Singh | G06N 3/045 | |

FOREIGN PATENT DOCUMENTS

DE 102022128311 A1 * 5/2024 ............. G06F 40/30

OTHER PUBLICATIONS

Hardware description language, Wikipedia, 2021, 12 pages, [retrieved on Oct. 29, 2025], Retrieved from the Internet: <URL:https://web.archive.org/web/20211225200833/https://en.wikipedia.org/wiki/Hardware_description_language>.*

* cited by examiner

*Primary Examiner* — Geoffrey R St Leger
(74) *Attorney, Agent, or Firm* — Standley Law Group LLP; Jeffrey S. Standley; Adam J. Smith

(57) ABSTRACT

Systems and methods for providing semantic preserving conversion of code into hardware dedicated languages are provided. A prompt is generated at a personal electronic device for building or providing code for conversion. The received code is processed through an artificial intelligence powered model which analyzes semantics of the provided code and converts the provided code into at least one HDL. The converted code is transmitted to the controller for execution at the industrial equipment.

20 Claims, 10 Drawing Sheets

FIG. 9

ARTIFICIAL INTELLIGENCE POWERED, SEMANTIC PRESERVING CONVERSION SYSTEM FOR HARDWARE DEDICATED LANGUAGES AND PROGRAMMABLE HARDWARE

CROSS-REFERENCE TO RELATED APPLICATIONS

This application claims the benefit of U.S. provisional patent application Ser. No. 63/395,932 filed Aug. 8, 2022, the disclosures of which are hereby incorporated by reference as if fully restated herein.

TECHNICAL FIELD

Exemplary embodiments relate generally to a conversion systems and method which utilizes artificial intelligence ("AI") to provide semantic preserving conversion for hardware dedicated languages ("HDLs") and programmable hardware, such as programmable logic controllers ("PLC").

BACKGROUND AND SUMMARY OF THE INVENTION

The current state of the manufacturing machine controls industry is led by over twenty major PLC providers, not to mention the many providers of other type of controller hardware for various types of equipment (e.g., cameras, robots, sensors, conveyor equipment, manufacturing and processing equipment, combinations thereof, or the like). Each controller provider normally provides specialized end-to-end hardware and software for their controllers. Due to, for example, varying budgets, robotics compatibility, and company partnerships, many manufacturers end up with controllers from a combination of these controller providers and thus, specialized languages, sometimes called hardware dedicated languages ("HDLs") are required to operate all of the various controllers. This leads to a niche pool of individuals possessing the requisite knowledge to program the various controllers. The controllers thus quickly turn into legacy hardware that is difficult to maintain due to a lack of skilled labor.

Some such providers offer online portals which permit conversion between certain software languages. These offerings, however, lack automation and robustness, and thus still often require specialized knowledge and/or time-consuming debugging efforts. Some such providers offer graphical user interfaces ("GUIs") that simplify programming by way of available selections at the GUI which are converted on the back-end into HDL. However, these GUIs generally limit coding in specific, pre-programmed ways. Regardless, current offerings generally lead to a niche pool of control specialists possessing the requisite knowledge to program, maintain, and evolve the various controllers and/or HDLs.

In research environments, for example, there are engineers and other individuals who do not specialize in hardware programming but have problems and test cases with a need for controlling outputs as sequential operations. These individuals may be able to script in certain, relatively basic coding languages (e.g., Matlab® and Python™), but these languages may not support hardware programming, which may have HDLs. If individuals with required knowledge are not directly allocated to specific teams or companies, then it can be hard to upskill/get their time to teach and guide on hardware programming. Therefore, there is a need to increase accessibility/move to more open systems and minimize on vendor locked hardware programming.

Systems and methods for AI-powered, semantics preserving conversion for controllers, such as with HDLs, are provided. The provided systems and methods provide for increased automation of language conversion and accuracy, among other benefits. One or more servers may comprise a compiler and testing software. A source code language and target language may be selected. The compiler may be configured to parse the source code and generate a syntax analysis, such as by way of one or more abstract syntax trees. A translation of the source code may be provided by an AI powered module into the target language by using one or more electronic translation dictionaries. The converted code may be processed through one or more testing and/or simulation modules of the testing software. The results may be automatically and/or manually reviewed for acceptability and/or modification. Feedback may be provided to the AI powered module and/or electronic translation dictionaries to improve future translations. The finalized converted language may be passed to the PLCs to operate various industrial robots.

In exemplary embodiments, without limitation, data may be collected, such as through various internet sources. The data may be cleaned and quality checked, which may include formatting and normalization. The data may be labeled, such as using coreference chains, intent, named entity recognition, and/or syntax trees, by way of non-limiting example. The data may be divided into training and evaluation sets. A deep learning technique may be used to train the AI algorithm which is utilized for the semantics preserving version. Use of the AI model may be provided through GUIs which facilitate uploading code or building code through graphical block-building. The system may convert the code though the AI model for translation into HDLs. Testing and evaluation may be performed before implementation into manufacturing equipment. Feedback, such as any errors identified during testing and evaluation, may be backpropagated to the AI model for improvement.

While PLCs are discussed in some instances, various types and kinds of programmable hardware (controllers) may be programmed with the system. Essentially, anything with programmable hardware, and especially different assortments of programmable hardware with dedicated languages within the same product or assembly line may be utilized. The disclosed systems and methods provide benefits from a manufacturing perspective as well as the product perspective. Existing language converters generally cannot take more than one file. For example, such converters cannot connect code between multiple files. Such converters are generally not capable of considering the intent (essentially, semantics) of the code. Such converters only translate the syntax (essentially, grammar). This means that function changes post-conversion and the code is almost useless until an expert manually reviews and fixes the code. Particularly when dealing with an assembly line at an OEM, there is no time to waste. The machine-leaning techniques and related system and components thereof shown and/or described herein capture semantics that span across multiple files/code suites as well as getting the syntax correctly. The testing modules also ensure that users are not losing functionality or breaking their code between conversions.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

Figure 9:
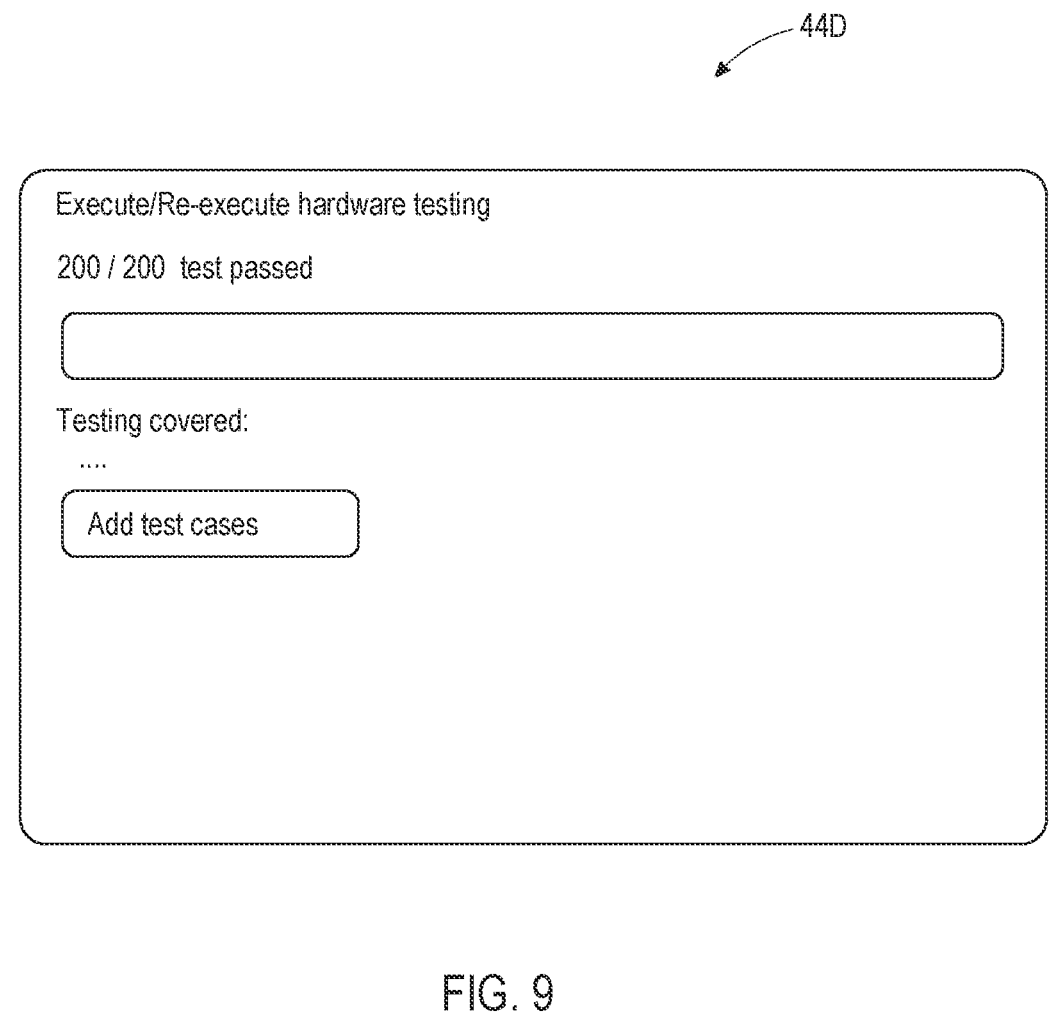

FIG. 9 is a plan view with an exemplary GUI for use with the system of FIG. 1.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
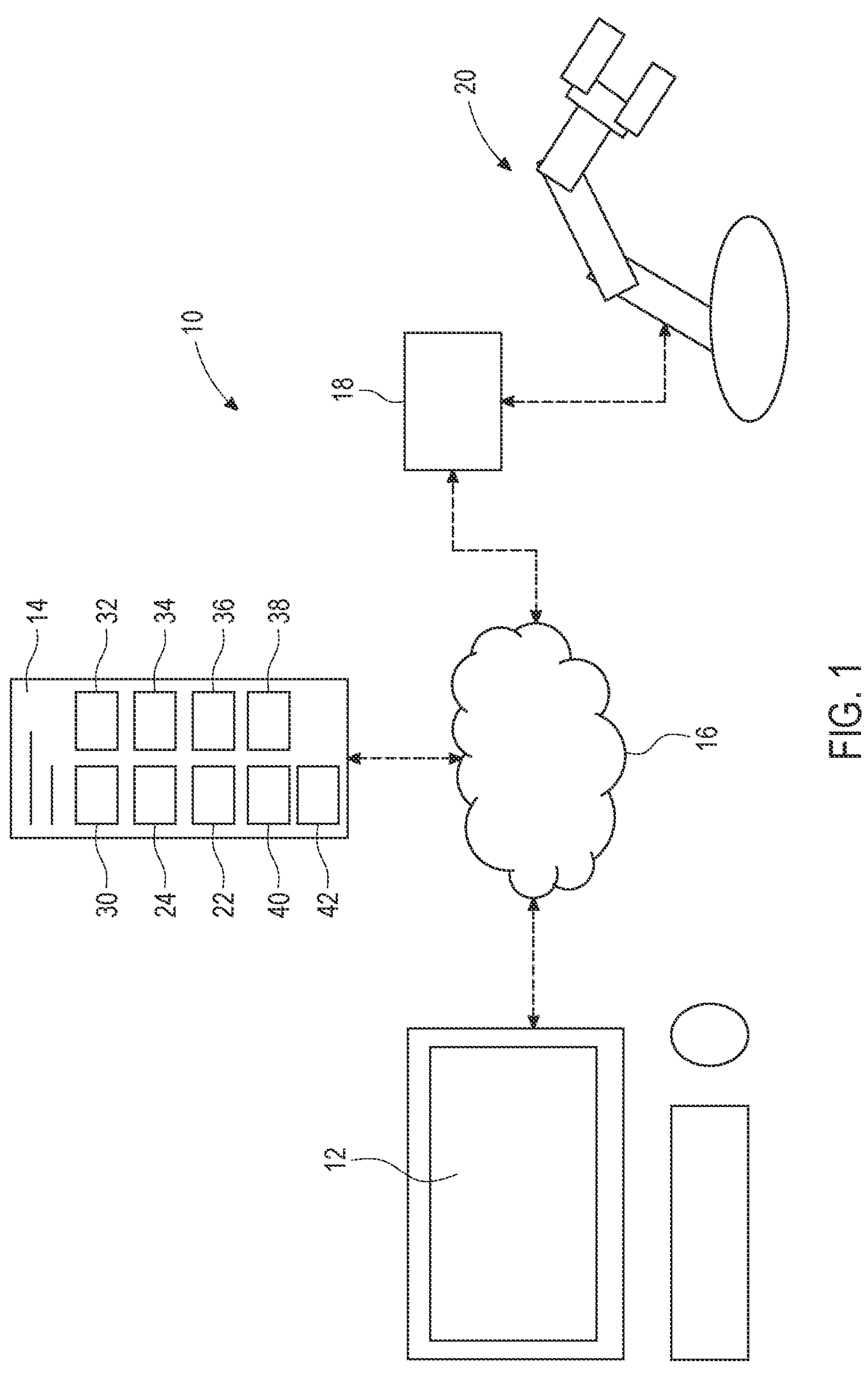
FIG. 1 is plan view of an exemplary AI powered, semantics preserving conversion system for controllers with HDLs.
Figure 2:
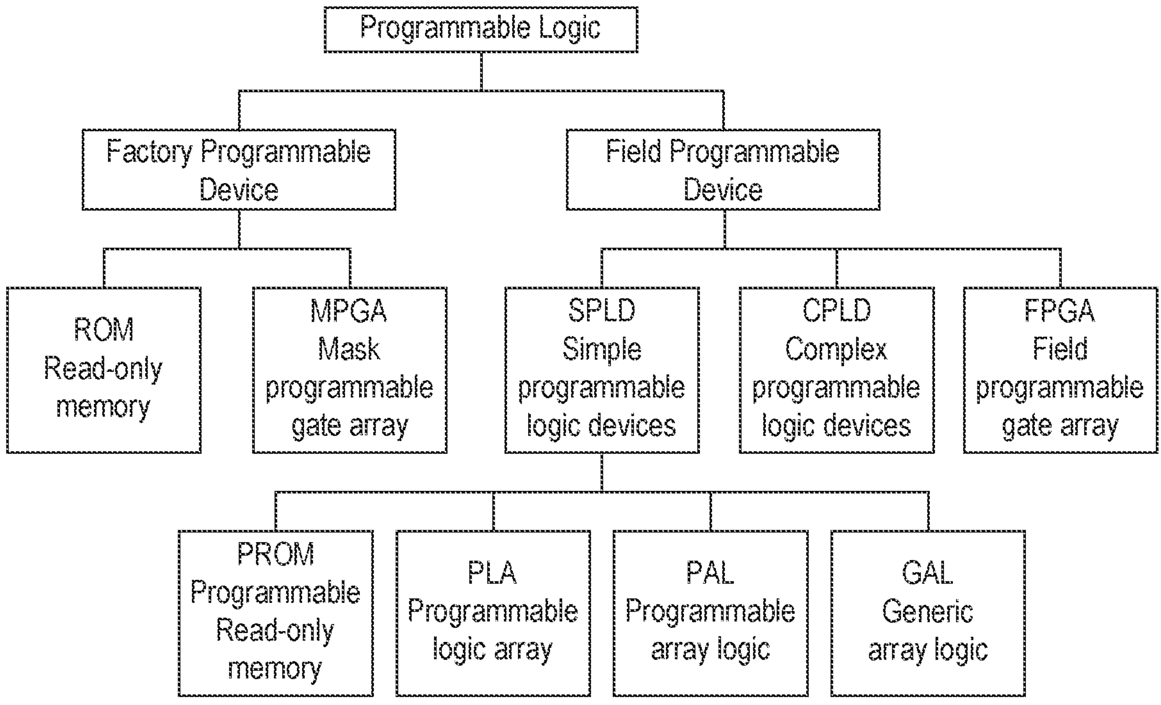
FIG. 2 is a simplified diagram of exemplary prior art types of controllers.

FIG. 1 illustrates an exemplary system 10 for AI powered, semantic preserving conversion for controllers 18 using HDLs. The controllers 18 may include PLCs and/or any one or more of the types and/or kinds of devices shown and/or described with regard to FIG. 2. The system 10 may comprise one or more personal electronic devices 12. The personal electronic devices 12 may comprise personal computers, servers, laptops, tablets, smartphones, e-readers, combinations thereof, or the like. The personal electronic devices 12 may be configured to receive user input with programming instructions. Input may be provided by one or more means, such as but not limited to, keyboard stokes, mouse clicks, graphical user interfaces (GUIs) 44, combinations thereof, or the like. In exemplary embodiments, without limitation, the user input may comprise programming instructions provided in any HDL for any type or kind of controller, such as but not limited to PLCs provided by Allen Bradley™, Siemens™, or Mitsubishi™ to name a few examples, without limitation. User input may be provided by way of any type or kind of programming software or interfaces. User input may be stored as one or more source files.

The system 10 may comprise one or more servers 14. The servers 14 may host one or more applications and/or otherwise comprise one or more software routines configured to convert the user input, such as stored as the one or more source files in a source language, into one or more other HDLs, such as in one or more converted files. The servers 14 may comprise one or more conversion modules, lexicographic conversion databases, AI modules, testing and/or simulation software modules, combinations thereof, or the like. Alternatively, or additionally, such software routines and/or databases may be provided at the personal electronic devices 12.

The system 10 may comprise one or more controllers 18. The system 10 may comprise one or more items of automated industrial manufacturing equipment ("equipment") 20, such as but not limited to industrial robots, conveyors, sorters, cameras, sensors, welding robots, fastening robots, inspection robots, locating robots, adhesive application robots, material handling robots, autonomous guided vehicles, to name some examples without limitation. Each of the controllers 18 may be in wired or wireless connection with one or more of the items of equipment 20.

The personal electronic devices 12, servers 14, and/or controllers 18 may be in electronic communication by way or one or more networks 16. The networks 16 may comprise one or more internets (e.g., the world wide web), intranets, cellular networks, combinations thereof, or the like. Such electronic connection may be made by way of one or more wired (e.g., Ethernet) and/or wireless connections (e.g., wifi, near field communication).

Figure 3:
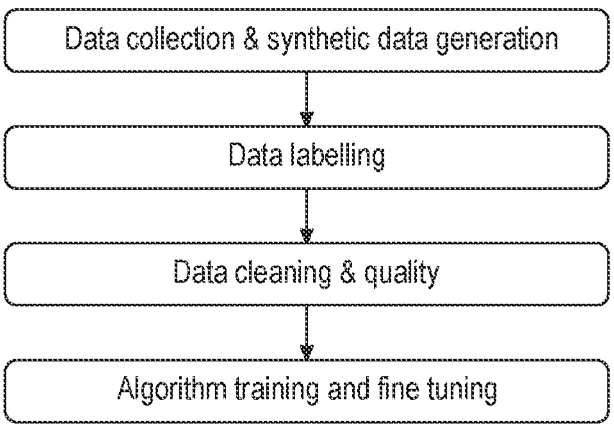
FIG. 3 is a flow chart with exemplary logic for operating the system of FIG. 1.

Referring additionally to at least FIG. 3, in exemplary embodiments, without limitation, the server(s) 14 and/or personal electronic devices 12 may comprise one or more of: a data collection module 30, a data cleaning and quality module 32, a data labelling module 34, an algorithm training and backpropagation module 36, a database/data storage module 38, an application module 40, a GUI module 42, a complier module 22, a testing and/or simulation module 24, combinations thereof, or the like. The system 10 may process through some or all such modules 30, 32, 34, 36, 24, and/or 22 in the order shown in FIG. 3 or other orders, such as with certain steps repeated, omitted, performed sequentially, performed simultaneously, and/or performed in various orders.

Data Collection

The data collection module 30 may be utilized, such as on the back-end, to generate and collect source code, conversion dictionaries, combinations thereof, or the like in all or various target HDLs for training of an AI model, such as used as part of the complier module 22. The data collection module 30 may be configured to collect such information from one or more code bases for the HDLs, such as which may be publicly and/or privately accessible via the internet. Such code bases may include example code, definitions, conversion dictionaries, combinations thereof, or the like. One or more web-based crawlers or other tools may be utilized to obtain the same.

Through current natural language programming (NLP) tools, various parameters can be tuned to generate HDL code that controls various kinds of outputs (i.e., robots or other kinds of functions) and can be used as sample data. Because HDLs are more often used in manufacturing/specialized environments, the entire package of code is not as easily found online as it is for relatively well-known languages such as Python™ or Java™. The data collection module 30 may utilize one or more synthetic data generation techniques to generate examples. In this way, the AI model may be exposed to a wide variety of coding styles for increased accuracy of conversion (i.e., using specific versus vague variable names and understanding the connection between them).

In this fashion, language conversion dictionaries and other tools may be obtained or derived, such as through example code in various languages, which may be parsed, analyzed, and compared.

Data Cleaning and Quality

The data cleaning and quality module 32 may be configured to clean and verify the data collected by the data cleaning and quality module 32. The data collected will likely contain unnecessary information. If the code is collected through online sources, for example, it may be verified by the data cleaning and quality module 32 to ensure by the that proper syntax and function are used as the basis for the AI model to learn from. Such verification may be provided by way of one or more debugging subroutines to identify errors in compiling. This may allow the model to be exposed to the HDLs in written by various skill level individuals, from professionals to novices. The data cleaning and quality module 32 may be configured to remove duplicated or incomplete data. The data cleaning and quality module 32 may be configured to perform formatting, as needed, to ensure the data fed to the model is consistent when training. Normalization may be applied by the data cleaning and quality module 32 so that the model is adapt to capitalizations and different punctation, for example. Data augmentation by the data cleaning and quality module 32 may allow for a bigger dataset with more variety to be introduced to the model—for example, without limitation, by swapping variables names or back-translation (this may allow for the model to translate a line of code from source to target and then translate it back to the source language by way of non-limiting example).

Data Labelling

The data labelling module 34 may be configured to label data processed through the data cleaning and quality module 32. Proper labeling may allow the AI model to understand connections between words and meaning. For each set of data/code examples, the data labelling module 34 may be configured to label the data by line in the code and tag the data. The data labelling module 34 may be configured to utilize one or more of, by way of non-limiting example: coreference chains, intent, named entity recognition, and syntax trees, and the like. For example, coreference chains involve multiple words that refer to the same entity. This may occur between languages where a key word in one HDL that signals a specific function to the compiler module 22 acts as a regular word in another HDL. In this way, the model may understand the difference in context between when specific words are key words as opposed to normal words. Another example, without limitation, is where a function is deprecated in a newer version of the code, or the function does not exist yet in an older version of the code. This can be confusing for humans themselves and thus the data labelling module 34 may be configured to label such occurrences in the code.

While manual annotation is the most time-consuming method of annotating the data, it may be utilized, at least in part, to provide increased assurance of accuracy in the annotations, considering the specialized nature of hardware dedicated languages and nuanced nature of version histories. Alternatively, or in addition, automated annotation and other labeling may be provided by the data labelling module 34.

A feedback loop may be provided to the data labelling module 34 so that the data annotation may occur as the model begins to convert code. For example, if the user is willing, any errors in conversion will be marked and sent back as feedback to the algorithm so it may update and pivot on those mistakes in real time. Alternatively, or additionally, certain errors may be automatically processed.

Algorithm Training and Backpropagation

The algorithm training and backpropagation module ("AI module") 36 may be configured to process the labeled data from the data labelling module 34, such as to generate the AI model, which may be contained at the same. The AI module 36 may be configured to divide the collected and annotated data into at least two sets. The AI module 36 may utilize the first set of the data to train the algorithm, and use the second set to assess performance of the model.

Once trained to recognize patterns and generate code, the AI module 36 may be configured to evaluate and refine the AI model as necessary. The AI module 36 may employ one or more deep learning techniques that may train on the large and varied data provided by the prior modules, 30, 32, and/or 34.

The AI module 36 may be configured to split the input line of code into tokens (e.g., smaller units) so that the model understands the large vocabulary in the HDLs. As some letters by themselves can have meaning, the model may be trained to consider and understand the meaning of even single letters. Punctuation may be included in tokens to understand code structure and syntax within the languages. Certain tokenization techniques may not provide a level of understanding beyond the context of the input sentence. After tokenization, tokens may be embedded into vectors that represent the meaning of the token. Word and positional embeddings may be provided to understand words and their positional relevance. Summation of the word and positional embeddings may be passed into the transformer layers. Understanding past the scope of the input sentence and contextual comprehension (semantics, not just syntax) may be understood by utilizing the AI module 36 to leverage advanced neural network architectures, including but not necessarily limited to, document pair transformers, graph transformers, and/or memory-augmented transformers. In general, transformers' attention mechanisms may permit for building relationships between variables and lines of code. Leveraging even more specialized techniques, such as memory-augmented transformers, may allow the AI module 36 to understand dependencies between variables and functions across files. The AI module 36 may include many layers containing self-attention and feed-forward neural networks that may allow for context to be passed from previous layers and integrated across the code base. The embedded tokens may be transformed through the multiple layers described above, which may allow for a representation of the code to be developed that captures underlying meaning by the AI module 36 may. The output of the transformer layers of the AI module 36 may include a new set of embeddings which may be used to make predictions on the target conversion. Based on the context and meaning, weights may be applied by the AI module 36 may to the relevance of each token and a probability distribution developed over all possible tokens that may equate to the current embedding. The AI module 36 may be configured to select tokens based on higher probability. This may be performed iteratively. A language dictionary may be built for each HDL and an abstract syntax tree may be leveraged and refined with every new translation as input to the algorithm in exemplary embodiments, without limitation. In this fashion, the syntax trees may be updated, such as each time the AI model learns more and/or is used. In this way, after initial training, the system 10 may utilize error information and/or other feedback from conversions and using the feedback to refine the syntax trees and/or other aspects of the model.

Database/Data Storage

The system 10 may comprise one or more database/data storage modules 38. The modules 22, 30, 32, 34, and/or 36 may be data intense. Being that the model, in particular, is resource intensive and converts highly dimensional data, one or more databases may be employed to preserve user data, unfinished projects/conversions, finished projects and conversions, amongst other data for each user as provided by the one or more database/data storage modules 38. The database/data storage modules 38 may include a mix of relational databases, nosql databases (i.e., graph database) and distributed systems for highly structured, large-scale data and easy searchability by way of non-limiting example.

API Development

The system 10 may include an application module 40 which may provide the application used by the user of the personal electronic devices 12. Some or all of the application may be hosted at the server(s) 14 and/or installed at the personal electronic devices 12. APIs may be developed in several scripting languages, such as but not limited to Python™ and Matlab™, such as to allow for easy accessibility and getting started with hardware dedicated programming. These may utilize the system 10, or components thereof, to convert and test simple function names into hardware code for example.

UI Development

The system 10 may include a GUI module 42. The GUI module 42 may provide one or more interfaces 44, such as through a front-end framework that may communicate with the databases and API endpoint of the machine learning model, such as to access predictions, display them to the user, and store data entered by the user.

Exemplary interfaces 44 are provided in FIG. 6 through FIG. 9, without limitation. As provided in exemplary interface 44A, options may be provided for coding by diagram, using developer APIs, uploading and converting existing code, searching past conversions, executing/re-executing hardware testing, by way of non-limiting example. As provided in exemplary interface 44B, the code by diagram option may include search and filter options, and an HDL playground by way of non-limiting example. The HDL playground may generate the Verilog code in real time, or substantially real time and connect variables and functions. The HDL playground may generate a blueprint of sorts for the file structure and functions requested by the user based on what has been selected (e.g., dragged and dropped). As provided in exemplary interface 44C, the upload and convert option may include options to upload existing code and select a target language. Drag and drop functionality, drop down or other menu formats and/or interface functionality may be employed by way of example. The file structure may optionally be displayed and previewed. As provided in exemplary interface 44D, the testing option may provide a display of tests performed and performance, by way of non-limiting example.

Figure 4:
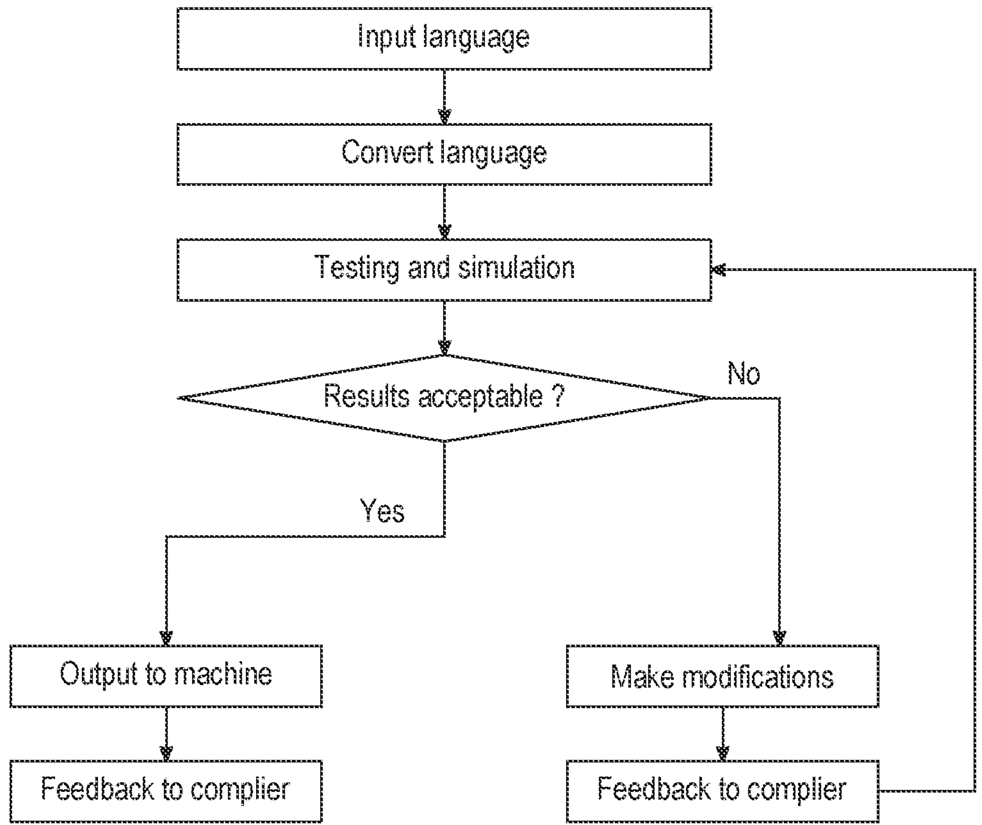
FIG. 4 is a flow chart with other exemplary logic for operating the system of FIG. 1.
Figure 5A:
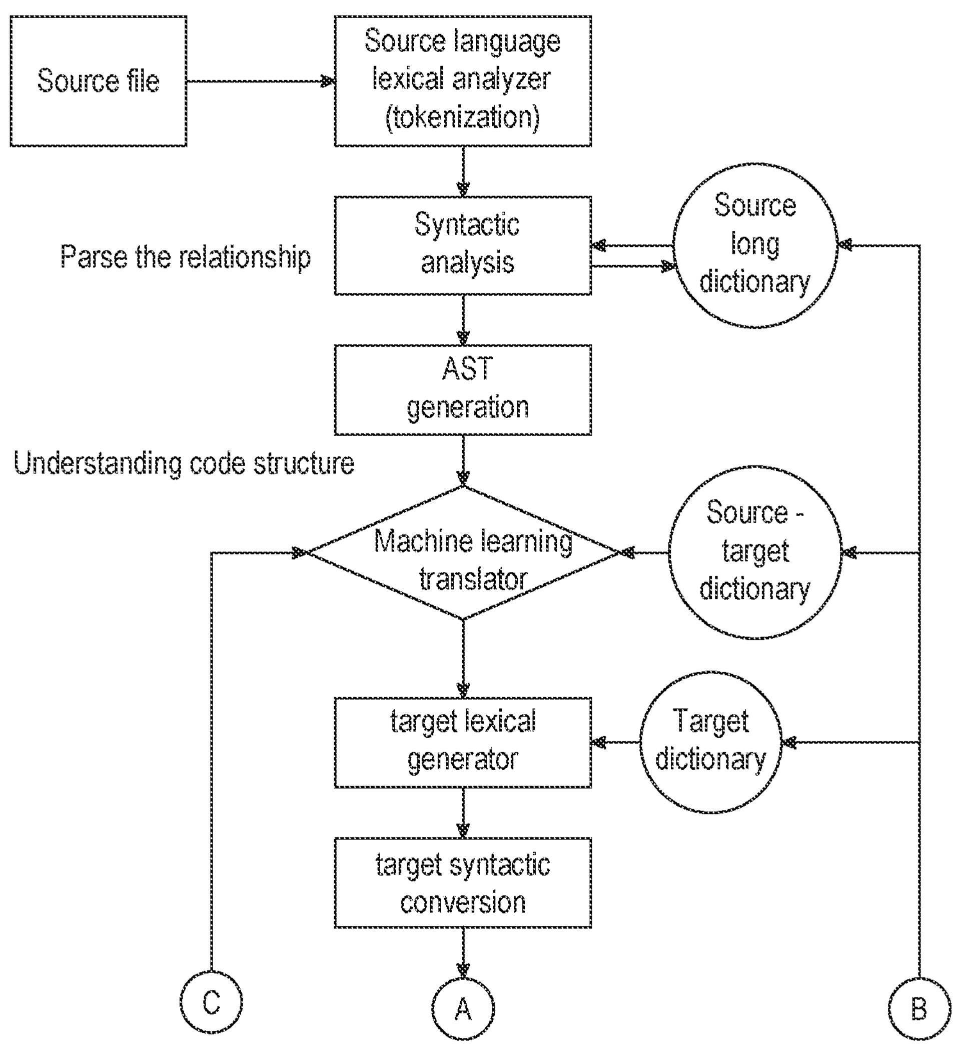
FIG. 5A is a flow chart with other exemplary logic for operating the system of FIG. 1.
Figure 5B:
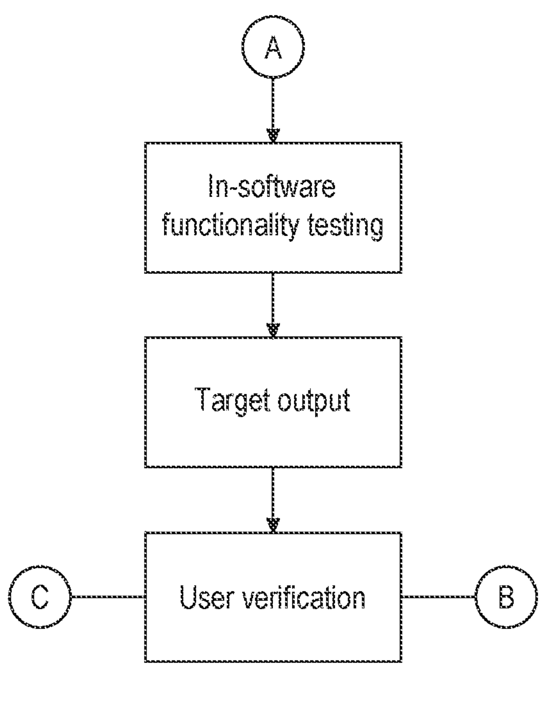
FIG. 5B is a continuation of the flow chart of FIG. 5A.
Figure 6:
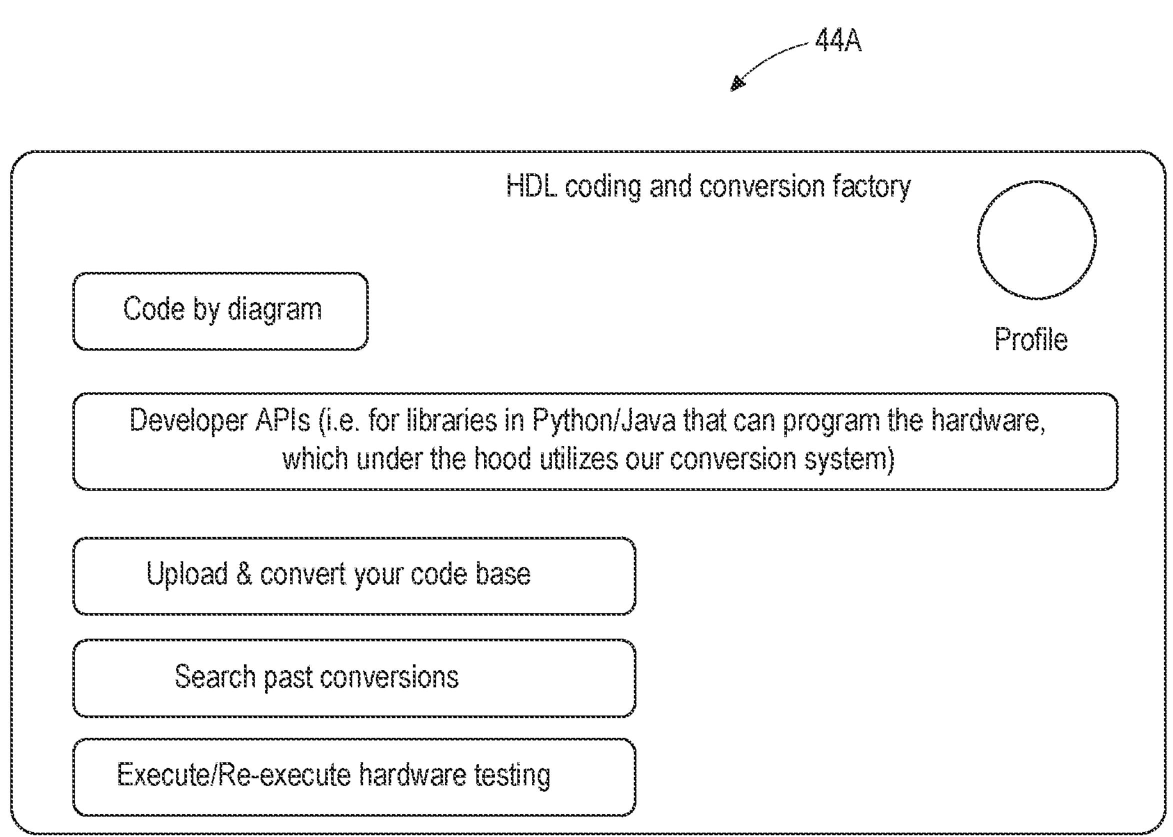
FIG. 6 is a plan view with an exemplary GUI for use with the system of FIG. 1.
Figure 7:
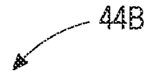
FIG. 7 is a plan view with an exemplary GUI for use with the system of FIG. 1.
Figure 7:
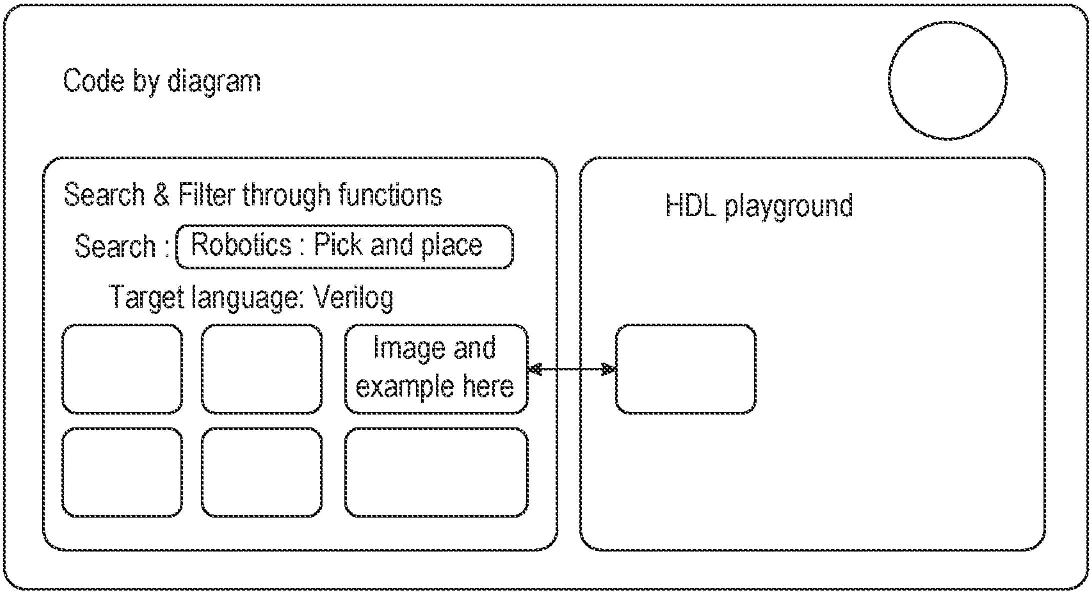
Figure 8:
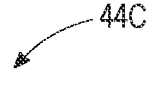
FIG. 8 is a plan view with an exemplary GUI for use with the system of FIG. 1.
Figure 8:
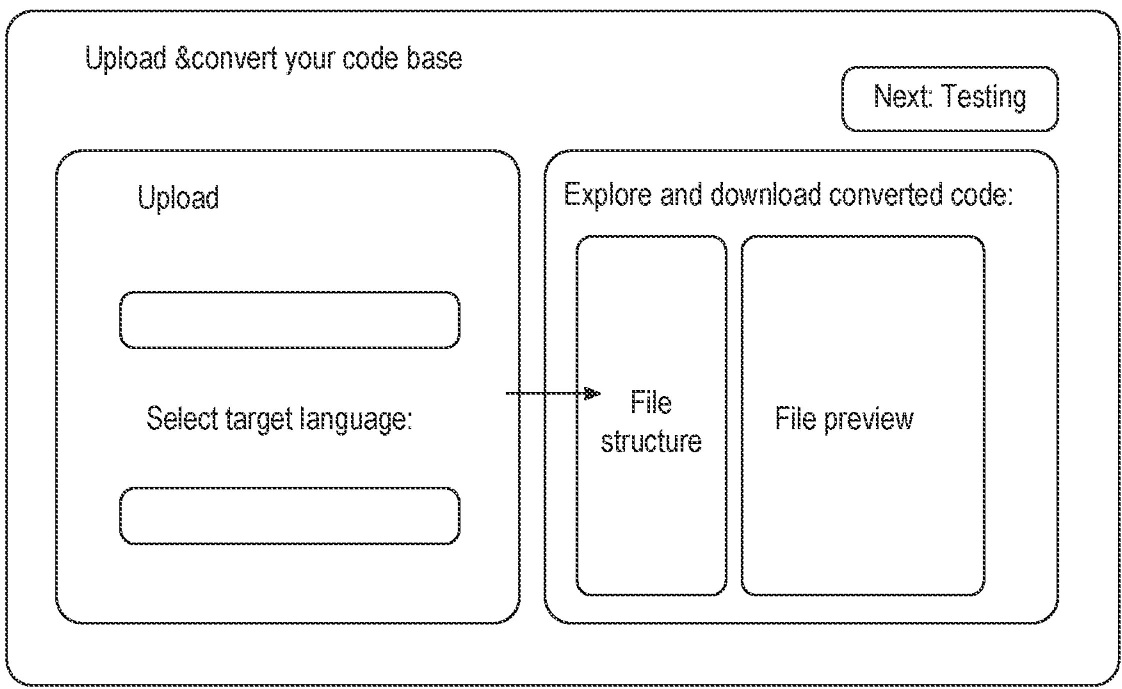

FIG. 4 and FIG. 5A to FIG. 5B provides exemplary methods for using the system 10. User input may be provided, such as at the personal electronic devices 12. User input may be accepted in the form of: ladder logic, structured text, functional block diagrams, instruction lists, sequential function charts, combinations thereof, or the like, by way of non-limiting example. The user input may be provided in the form of one or more source files and may be stored in the source format or one or more different formats. The user input may be provided at the compiler module 22, by way of non-limiting example.

User input may comprise an indication of the language of the source code. Alternatively, or additionally, the language may be automatically detected, such as by comparing on or more portions of the source code with various language dictionaries.

The source files may be converted into one or multiple controller 18 languages. User input may comprise target controller 18 languages for conversion. Alternatively, or additionally, the target controller 18 languages for conversion may be user designated and/or automatically determined based on the controller 18 and/or equipment 20 designated to receive the instructions, which may be specified by user input or automatic detection following electronic connection to the system 10, by way of non-limiting example. The source file conversions may be performed at the server(s) 14, by way of non-limiting example. The source files as converted may be electronically stored as one or more converted files. The conversion may be performed at the compiler module 22, by way of non-limiting example.

To perform the conversion, the compiler 22 back-end may be configured to utilize one or more of a rule-based generation, abstract syntax tree, a symbol table, and/or a machine learning/AI algorithm. The compiler 22 may be configured to take the source language of the source files and use a recursive descent parser to recognize goal symbols and build a tree node relating to which language element was recognized, and then attach it to the tree node. The compiler 22 may subsequently traverse the syntax tree breadth first and use the nodes and symbol table to convert to one or more target languages. The compiler 22 may be configured to track, and electronically store, one or more electronic dictionaries for the source language and/or target languages to store its nuances and unique characters, tokens, and/or features. The compiler 22 may utilize a machine learning/AI algorithm that is configured to translate for the syntax of one or more various languages and the semantics of the code. The compiler 22 may be configured to utilize one or more electronic conversion dictionaries as well as previously trained datasets to understand what the user was trying to develop. Once conversion is complete, the system 10 may be configured to test the converted code through automated testing to ensure functionality is preserved, such as by way of the testing and/or simulation modules 24.

Alternatively, or additionally, the compiler module 22 may be configured to take code from languages such as Python and Java and convert those to assembly machine language and program equipment 20 directly from the personal electronic device 12. The compiler module 22 may generate a representation of each computation and its dataflows and map this to the machine instructions with the assistance of machine learning/AI algorithms.

The converted files may be processed through the testing and/or simulation module 24. The testing and/or simulation module 24 many comprise, for example without limitation, one or more debugging routines, exemplary functions or features which may be performed by one or more exemplary controllers 18 and/or equipment 20, planned functions or features for the source files, combinations thereof, or the like. Output indicating successful testing and evaluation and/or problems encountered (e.g., errors, missing functionality, etc.) may be provided, such as at the personal electronic devices 12. Where problems are encountered, modifications may be requested, such as from users at the personal electronic devices 12 and/or automatically suggested by one or more AI routines. Where the results are acceptable, the finalized converted files may be stored and transmitted to the controller(s) 18 for use with the equipment 20.

The testing framework, such as provided by the testing and/or simulation module 24, may include various stages to ensure all requirements are met and the converted code is reliable to control industrial processes. If the user has provided a specific set of test cases from existing code, those may be uploaded, stored, and/or run to ensure that the converted code passes all such tests as it presumably did prior to conversion. If there are errors, such information may be backpropagated through the AI model, such as by way of the algorithm training and backpropagation module 36. Main areas of testing may include, by way of non-limiting example, functional testing of inputs and outputs to ensure appropriate responses and simulation testing of the hardware. Additionally, boundary testing and hardware in the loop testing may be provided, amongst others, such as to send data back and forth between the real environment (e.g., equipment 20) and the conversion system 10 in real time or substantially real time, to make adjustments to the broken code as it encounters errors in testing. Digital twinning may alternatively, or additionally, be provided.

Feedback may be provided to the compiler 22 regarding successfully and/or unsuccessful testing and/or simulations performed at the testing module 24. Such feedback may be provided manually, such as by user review and/or modifications made. Alternatively, or additionally, feedback may be provided automatically based on results and/or modifications made. Feedback may include modifications made to the converted files to more accurately and/or completely translate the source files from the source language into the target language(s).

The compiler 22 may be configured to provide a user with an ability to view the code in a development mode as the compiler 22 is running, such as by way of one or more graphical user interfaces ("GUIs") at the personal electronic devices 12. The testing and/or simulation modules 22 may be configured to provide the user with an ability to view the code in a simulation mode as it is running tests, such as by way of one or more GUIs at the personal electronic devices 12. Once the user verifies functionality has been retained, the feedback may be sent back to the machine learning/AI algorithm to be used as training data, such as for updating the complier 22.

As illustrated with particular regard to FIGS. 4A-4B, user programming in the form of one or more source files may be provided to the complier module 22. In exemplary embodiments, such source files are generated and uploaded from the personal electronic devices 12 to the servers 14, though such is not required. The source language may be detected at the compiler 22, such as by comparing some or all terms used against a lexicographical database of controller 18 language terms. The compiler 22 may be configured to tokenize the source file.

The compiler 22 may be configured to parse relationships between the various commands in the source file. Such parsing may be provided by a recursive descent parser, by way of non-limiting example. A syntactic analysis may be performed of the source file, such as by comparing the terms against one or more electronically stored source language dictionaries, which may be provided at the server(s) 14 by way of non-limiting example.

The structure of the source files may be understood by the compiler 22 by way of abstract syntax tree generation in exemplary embodiments, without limitation.

The compiler 22 may perform a translation of the source file into one or more additional languages, such as by use of one or more machine learning/AI algorithms and/or techniques. Such translation may, alternatively or additionally, be performed by use of one or more electronic language dictionaries, such as using a find and replace technique, conversion dictionaries, combinations thereof, or the like. In this fashion, the sources code may be converted into one or multiple languages for one or multiple types of controllers 18. The translated code may be further converted on a syntax basis, such as by way of abstract syntax tree generation in exemplary embodiments, without limitation. For example, without limitation, literally translated terms may be further modified and/or the structure of the code may be reorganized or otherwise modified to provide a more accurate and/or complete translation.

The testing and/or simulation module 24 may be configured to simulate execution of the converted code on one or more other controllers 18 and/or equipment 20. Automatic or manual verification of the results may be provided and the code may be updated as needed. Feedback in the form of the automatic or manual verification and/or updates may be provided to the machine learning/AI algorithms for improving subsequent conversions.

The system 10 may be adapted to update the AI model or other components from time to time, such as when various language updates are released by way of non-limiting example. In exemplary embodiments, without limitation, release documents may be reviewed, such as in an at least partially automated fashion. For example, web-based crawlers may be used to find electronic release documents, which may be automatically downloaded and/or electronically scanned, such as with optical character recognition software (as needed), to review changes and adapt them into the AI model and/or syntax trees. Language version specific forms of the model and/or trees may be stored and recalled for use, such as for converting between various version specific forms of the languages. In this way, programmers are not necessarily required to adapt coding or hardware to newer versions, for example.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphone, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein.

The invention claimed is:

1. A computer implemented method of providing semantics preserving conversion of code for hardware dedicated languages ("HDLs"), said method comprising:
building a code library from one or more code sources;
cleaning and quality checking code at the code library;
labeling code within the code library;
dividing the labeled code into a first set and a second set;
training an artificial intelligence powered model ("AI model") store at a server for analyzing semantics of the received code and converting the received code for the HDLs with the first set of the labeled code;
validating the AI model with the second set of the labeled code;
generating an electronic prompt at a personal electronic device for building or providing code for conversion;
processing received code from the personal electronic device through the AI model to analyze semantics of the received code and convert the received code for at least one of the HDLs; and
transmitting converted code to a controller for execution at industrial equipment.

2. The method of claim 1 wherein:
building the code library comprises utilizing one or more web-crawlers, wherein the one or more code sources comprise internet accessible code repositories and dictionaries;
cleaning and quality checking the code comprises normalizing the code and removing duplicate and partial code;
labeling the code comprises use of one or more of: coreference chains, intent, named entity recognition, and syntax trees; and
training the AI model comprises tokenizing an input line of code, embedding tokens into vectors representing a meaning of a token, and utilizing one or more neural network architectures comprising one or more of: document pair transformers, graph transformers, and memory-augmented transformers.

3. The method of claim 2 wherein:
the code library comprises source language dictionaries and HDL dictionaries.

4. The method of claim 3 wherein:
processing the received code through the AI model comprises executing at least one testing routine on the converted code.

5. The method of claim 2 wherein:
processing the received code through the AI model comprises:
determining potentially available conversion meanings for each portion of the received code;
identifying related ones of the tokens for each of the potentially available conversion meanings;
developing a probability distribution over each of the related ones of the tokens;
weighting the related ones of the tokens in accordance with the probability distribution; and
selecting the highest weighted one of the related ones of the tokens for use in the conversion.

6. The method of claim 5 wherein:
processing the received code through the AI model comprises:
identifying any errors when executing at least one testing routine on the converted code; and
backpropagating the errors to the AI model and updating the AI model accordingly.

7. The method of claim 1 wherein:
the personal electronic device comprises a computer;
electronic communication is established by way of an internet;
the controller comprises a programmable logic controller; and
the industrial equipment comprises a material handling robot and a machine vision camera.

8. The method of claim 7 wherein:
the prompt comprises at least one graphical user interface ("GUI") with a build by diagram option and an upload code option.

9. A system for providing semantics preserving conversion of code for hardware dedicated languages ("HDLs"), said system comprising one or more non-transitory electronic storage devices comprising software instructions, which when executed, configure one or more processors to carry out the method of claim 1.

10. A system for providing semantics preserving conversion of code for hardware dedicated languages ("HDLs"), said system comprising:
a personal computer;
a server in electronic communication with the personal computer by way of an internet;
a programmable logic controller ("PLC") in electronic communication with the server by way of the internet;
industrial equipment in wired electronic communication with the PLC comprising a material handling robot and a machine vision camera;
wherein said server comprises software instructions, which when executed, configure the server to:
utilize web-crawlers to build a code library from internet available sources comprising code repositories, source language dictionaries, and HDL dictionaries;
clean and quality check the code at the code library by at least normalizing the code and removing duplicate and partial code;
label the code within the code library using one or more of: coreference chains, intent, named entity recognition, and syntax trees;
divide the labeled code into a first set and a second set;
build and train an artificial intelligence-based model ("AI model") from the first set of the labeled code by at least tokenizing an input line of code, embedding tokens into vectors representing a meaning of a token, and utilizing one or more neural network architectures comprising one or more of: document pair transformers, graph transformers, and memory-augmented transformers; and
validate the AI model with the second set of the labeled code;

receive code by way of graphical user interfaces ("GUIs");

process the received code from the personal electronic device through the AI model by at least: determining potentially available conversion meanings for each portion of the received code by way of the dictionaries, identifying related ones of the tokens for each of the potentially available conversion meanings, developing a probability distribution over each of the related ones of the tokens, weighting the related ones of the tokens in accordance with the probability distribution, and selecting a highest weighted one of the related ones of the tokens for use in the conversion to arrive at a converted version of the received code for at least one of the HDLs;

execute at least one testing routine on the converted code to verify the conversion;

identify any errors when executing the at least one testing routine on the converted code; and backpropagate the errors to the AI model and update the AI model accordingly; and transmit the converted code to the controller for execution at the industrial equipment.

11. A computer implemented method of providing semantics preserving conversion of code for hardware dedicated languages ("HDLs"), said method comprising:

generating an electronic prompt at a personal electronic device for building or providing code for conversion, the prompt comprising at least one graphical user interface ("GUI") with a build by diagram option and an upload code option;

processing received code from the personal electronic device through an artificial intelligence powered model ("AI model") stored at a server which analyzes semantics of the received code and converts the received code into at least one HDL; and transmitting converted code to a controller for execution at industrial equipment.

12. The method of claim 11 wherein:

the personal electronic device comprises a computer;

electronic communication is established by way of an internet; and the controller comprises a programmable logic controller.

13. The method of claim 12 wherein:

the industrial equipment comprises a material handling robot and a machine vision camera.

14. The method of claim 11 further comprising:

building a code library from one or more code sources;

cleaning and quality checking code at the code library;

labeling code within the code library;

dividing the labeled code into a first set and a second set;

training the AI model with the first set of the labeled code; and validating the AI model with the second set of the labeled code.

15. The method of claim 14 wherein:

building the code library comprises utilizing one or more web-crawlers, wherein the one or more code sources comprise internet accessible code repositories and dictionaries;

cleaning and quality checking the code comprises normalizing the code and removing duplicate and partial code;

labeling the code comprises use of one or more of: coreference chains, intent, named entity recognition, and syntax trees; and training the AI model comprises tokenizing an input line of code, embedding tokens into vectors representing a meaning of a token, and utilizing one or more neural network architectures comprising one or more of: document pair transformers, graph transformers, and memory-augmented transformers.

16. The method of claim 15 wherein:

the code library comprises source language dictionaries and HDL dictionaries.

17. The method of claim 15 wherein:

processing the received code through the AI model comprises:

determining potentially available conversion meanings for each portion of the received code;

identifying related ones of the tokens for each of the potentially available conversion meanings;

developing a probability distribution over each of the related ones of the tokens;

weighting the related ones of the tokens in accordance with the probability distribution; and selecting the highest weighted one of the related ones of the tokens for use in the conversion.

18. The method of claim 17 wherein:

processing the received code through the AI model comprises executing at least one testing routine on the converted code.

19. The method of claim 18 wherein:

processing the received code through the AI model comprises:

identifying any errors when executing at least one testing routine on the converted code; and backpropagating the errors to the AI model and updating the AI model accordingly.

20. A system for providing semantics preserving conversion of code for hardware dedicated languages ("HDLs"), said system comprising one or more non-transitory electronic storage devices comprising software instructions, which when executed, configure one or more processors to carry out the method of claim 11.

* * * * *